United States Patent [19]

Fuerst et al.

[11] Patent Number: 5,478,239
[45] Date of Patent: Dec. 26, 1995

[54] DYNAMIC VISUAL ACUITY TRAINING METHOD AND APPARATUS

[75] Inventors: Randall F. Fuerst, Orangevale; Gregory A. Rossini, Loomis; Gus F. Carroll, Los Gatos, all of Calif.

[73] Assignee: Maximum Performance, Inc., Roseville, Calif.

[21] Appl. No.: 171,930

[22] Filed: Dec. 21, 1993

[51] Int. Cl.⁶ .............................. A63B 69/00; G09B 9/00
[52] U.S. Cl. .................. 434/247; 434/307 R; 273/26 R; 359/462
[58] Field of Search .................................. 434/20, 27, 29, 434/30, 38, 41, 43, 59, 69, 236, 247, 258, 307 R, 308, 365; 345/8, 7, 54, 82, 87, 88; 351/158, 246; 364/578, 419.2; 395/100, 118, 152; 359/46, 49, 51, 52, 56, 69, 70, 84, 94, 100, 106, 462; 348/45; 273/26 R

[56] References Cited

U.S. PATENT DOCUMENTS

| | | | |
|---|---|---|---|
| 3,972,589 | 8/1976 | Skelly et al. | 359/106 |
| 3,999,180 | 12/1976 | Hickman | 345/54 |
| 4,106,217 | 8/1978 | Witt . | |
| 4,152,846 | 5/1979 | Witt . | |
| 4,283,177 | 8/1981 | Kron et al. . | |
| 4,300,818 | 11/1981 | Schachar . | |
| 4,435,732 | 3/1984 | Hyatt . | |
| 4,461,477 | 7/1984 | Stewart | 273/26 R |
| 4,471,385 | 9/1984 | Hyatt . | |
| 4,482,326 | 11/1984 | Witt | 345/8 X |
| 4,688,900 | 8/1987 | Doane et al. | 359/52 |
| 4,781,440 | 11/1988 | Toda . | |
| 4,873,572 | 10/1989 | Miyazaki et al. | 348/45 |
| 4,985,762 | 1/1991 | Smith | 348/39 |
| 5,026,151 | 6/1991 | Waltuck et al. | 351/246 |
| 5,153,569 | 10/1992 | Kawamura et al. | 345/8 |
| 5,172,256 | 12/1992 | Sethofer et al. . | |
| 5,245,319 | 9/1993 | Kilian | 359/462 X |
| 5,308,246 | 5/1994 | Balocco | 434/236 |

OTHER PUBLICATIONS

"Crystal Eyes® Stereoscopic System for Computer Graphics and Video" by Stereographic Corp., Mar. 1990.

Primary Examiner—Joe Cheng
Attorney, Agent, or Firm—John P. O'Banion

[57] ABSTRACT

An apparatus and method for improving physical coordination and ability to react to moving and stationary objects is disclosed herein. A pair of voltage controlled liquid crystal lenses (14, 16) are mounted in a support frame (12) which is worn by a user in the same manner as conventional eyeglasses. The lenses (14, 16) can be electronically pulsed between an opaque state and a transparent state. Further, the lenses (14, 16) scatter background light in their opaque state rather than block the light so as to provide a generally constant level of contrast and brightness. This prevents pupil dilation changes when switching between the transparent state and the opaque state. Each lens can be made to pulse from an opaque state to a transparent state and then back again, and can be controlled independently or in synchronization. In operation, the user adjusts the control unit (18) to pulse the lenses (14, 16) at a high speed. An object is then viewed through the lenses and an appropriate response is made. As the user's proficiency increases, the user decreases the pulse rate and continues to react to the object. Reduction in pulse rate is continued until the desired level of reaction proficiency is achieved. When the apparatus is eventually removed, the user will be able to react to objects moving at higher speeds with greater proficiency. Additionally, in the case of both moving and stationary objects, the user's ability to concentrate will be increased.

27 Claims, 6 Drawing Sheets

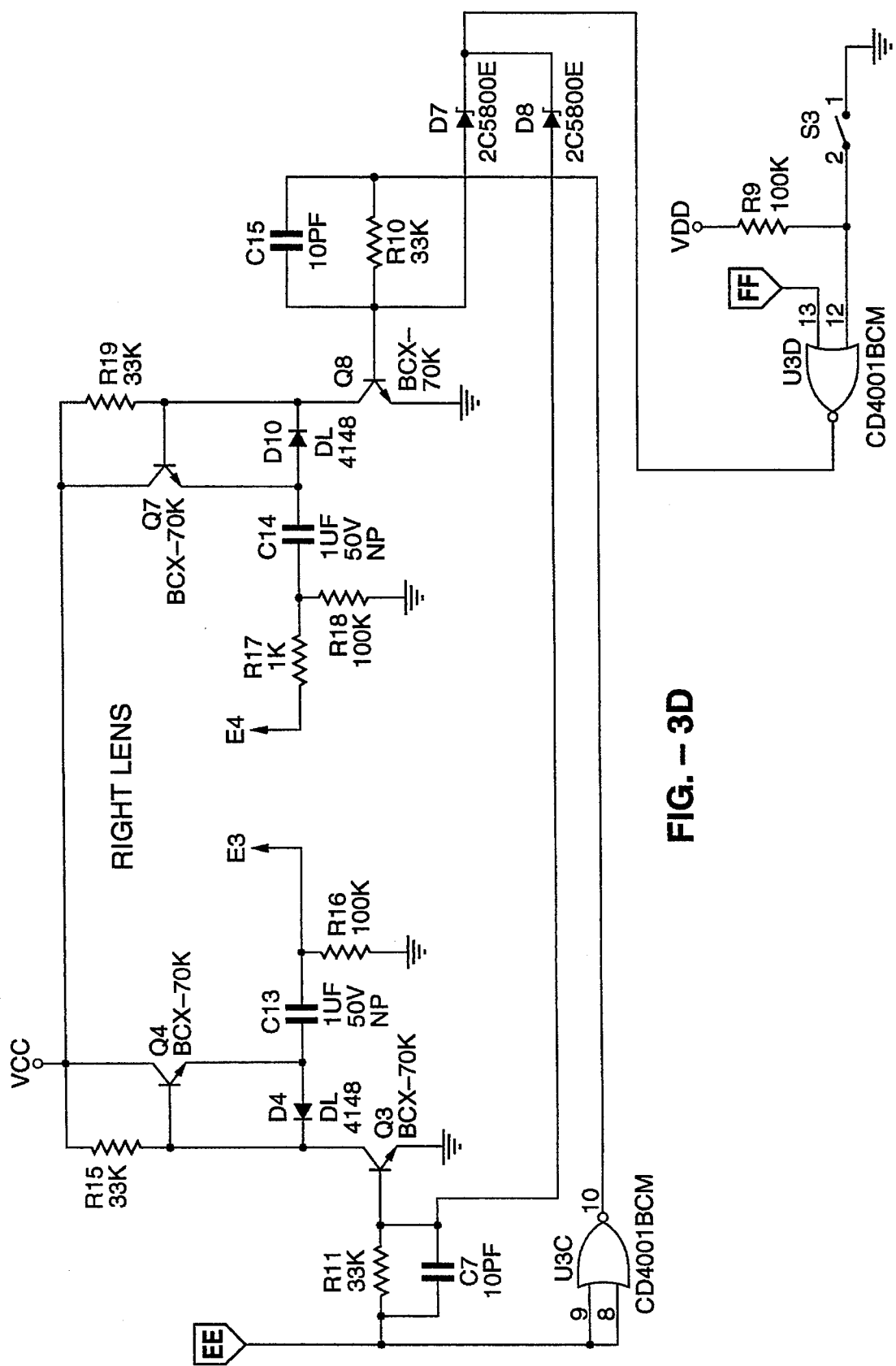
FIG. — 3D

DYNAMIC VISUAL ACUITY TRAINING METHOD AND APPARATUS

BACKGROUND OF THE INVENTION

1. Field of the Invention

This invention pertains generally to improving physical coordination, and more particularly to a method and apparatus for improving dynamic visual acuity in response to stationary or moving objects by controlling the amount of visual information transmitted to the eyes and brain.

2. Description of the Background Art

In order to improve their abilities, athletes generally concentrate on improving their physical capabilities and skills. Muscle tone and strength often play an important role in athletic ability and, as a result, there have been considerable developments in the area of exercise and training equipment. For some sports, muscle tone and strength are not as important as skill, which often comes naturally but more often is the result of repetitive practice. Therefore, a number of practice devices for improving skills have been developed. Examples include batting practice machines for baseball, ball serving machines for tennis, and swing perfecters for golf. These are just a small example of literally hundreds of practice devices which have been developed to improve an athlete's skills.

Many sports, such as baseball, tennis, basketball, football, hockey and skeet shooting require an ability to visually track a moving object of variable speed, and to quickly respond or react to that moving object. Reaction time can often be crucial and, as the speed of the object increases, visually tracking the object and reacting with the required preciseness becomes more difficult. Therefore, the need was seen for devices and methods which would permit an athlete to improve his or her reaction time and visual concentration on the moving object.

In order to improve reaction time and visual concentration, sports vision specialists have traditionally used a strobe light in darkened rooms to limit exposure of the eyes and brain to a moving object during its flight. The shorter exposure time which results from pulsating or "chopped" illumination of a moving object essentially causes the moving object to appear as if it is traveling slower than its actual rate of speed. As a result, a more rapid reaction response is required by the athlete. A significant drawback of this approach, however, is that the use of strobe lights is limited to times when background illumination is dim or non-existent. In other words, ambient light will nullify the strobe effect. Therefore, use of such devices has typically been limited to small, dark, indoor rooms. In addition, the strobe light can limit the athlete's range of motion. For example, if the athlete moves to a position where he or she is looking into the light, the athlete will be "temporarily blinded" by the afterimage that comes from looking into the light. Similarly, if the athlete shifts position so that he or she is outside of the penumbra, the athlete will experience difficulty with insufficient light levels. Also, use of strobe lights creates problems with eye dilation as a result of going from a dark state to a very bright state and then back again. As a result, the contrast of the moving object against the background varies and vision is impaired.

As can be seen, therefore, use of strobe lights becomes impractical for working on a field with a baseball player, on the court with a tennis player, on the ice with a hockey player, or in connection with most other indoor and outdoor sports. As such, a need exists for an apparatus and method for improving dynamic visual acuity in response to moving objects which can be used in an indoor or outdoor setting such as an actual playing field where background lighting can be in accordance with any playing condition, where the player can move freely, and where vision is not impaired from eye dilation. The present invention satisfies such need, as well as overcomes the deficiencies in the devices and methods heretofore developed.

SUMMARY OF THE INVENTION

The present invention is generally directed to an apparatus and method for improving physical coordination, including hand-eye coordination and hand-foot coordination. The invention can also be used for improving concentration and the ability to focus on both moving and stationary objects.

By way of example, and not of limitation, the invention comprises a pair of voltage controlled liquid crystal lenses which are mounted in eyeglass frames in a configuration which is worn in the same manner as conventional eyeglasses. The lenses can be electronically switched from an opaque state to a transparent state, and take on a generally "white" color when in their opaque state. This results from the lenses being of a character where they scatter light in their opaque state rather than block light. Therefore, a generally constant level of contrast and brightness results so as to prevent pupil dilation changes when switching between the transparent state and the opaque state.

The lenses are switched from their normally opaque state to a transparent state by means of an electronic control unit. The electronic control unit can be a remote device coupled to the lens/frame assembly by a cable and worn by the user or, alternatively, can be integrated into the frame which houses the lenses. Each lens can be made to pulse from an opaque state to a transparent state and then back again, and can be controlled independently or in synchronization. Independent control permits the athlete to maintain one lens in the opaque state while pulsing the other lens. Both the pulse speed as well as the on/off ratio of the lenses can be adjusted.

In operation, the user sets the control unit to pulse the lenses at a high speed. An object is then viewed through the lenses and an appropriate response is made. For example, moving objects such as baseballs thrown from a pitching machine would be viewed and the reaction would be to hit the balls with a bat. As the frequency with which the balls are hit increases, the pulse rate is decreased and the user continues to hit the balls. When the apparatus is eventually removed, the user will be able to hit higher speed balls than he or she would have been able to hit without using the apparatus for training. This is the result of the apparatus simulating, visually, movement at a slower than actual speed since fewer frames of information are received by the eyes and transmitted to the brain. For example, a baseball moving at an actual speed of 50 mph would appear to be travelling at a much slower speed. However, in order to hit the ball with a bat, the user will have to react as if the ball was moving at a much higher speed. Therefore, when the user trains in accordance with the present invention, he or she will develop the hand-eye coordination required to precisely react to higher speed moving objects with a resultant increase in level of skill.

The invention can also be used to increase a user's skill with regard to hitting stationary objects with a moving object. For example, the invention can be used to improve a golf swing by improving the user's ability to focus and concentrate on the ball. As with a moving object, the user would start by setting the control unit to pulse the lenses at a high speed. The user would then swing at the ball until he or she can consistently hit the ball. In this mode of operation, the user is trained to keep his or her eye on the ball while swinging in a smooth and consistent manner. Concentration can be further improved by keeping one lens in the opaque state while the other lens is pulsed on and off. As a result, any movement of the user's head will exaggerate or compound loss of visual contact with the stationary object. Furthermore, the present invention can be used to improve the user's concentration when viewing stationary objects such as targets or gauges, or when scanning from focal point to focal point.

Therefore, the present invention can be used to improve dynamic visual acuity in connection with sports activities, police and military applications, aviation applications, and many other activities and applications. Examples of sports activities include baseball, tennis, football, trap shooting, skeet shooting, target shooting, hockey, soccer, basketball, archery, golf, ping pong, racquetball, squash, handball, and volleyball. Police and military applications include shooting accuracy, target detection, and self-defense. Aviation applications include gauge recognition and visual scanning.

An object of the invention is to increase a person's hand-eye coordination.

Another object of the invention is to increase a person's hand-foot coordination.

Another object of the invention is to train a person to increase his or her concentration.

Another object of the invention is to train a person to increase his or her visual reaction skills.

Another object of the invention is to pulse visual information perceived by the eyes.

Another object of the invention is to visually simulate that an object is moving at a slower than actual speed so that a person must react as if the object was moving at a greater than actual speed.

Another object of the invention is to present visual information to an athlete in pulses without causing changes in eye dilation which would impair vision.

Another object of the invention is to reduce exposure time of the eyes and brain to a moving object.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 3A through 3D represent a schematic diagram of one embodiment of circuitry corresponding to the block diagram of FIG. 2.

DESCRIPTION OF THE PREFERRED EMBODIMENTS

Figure 1:
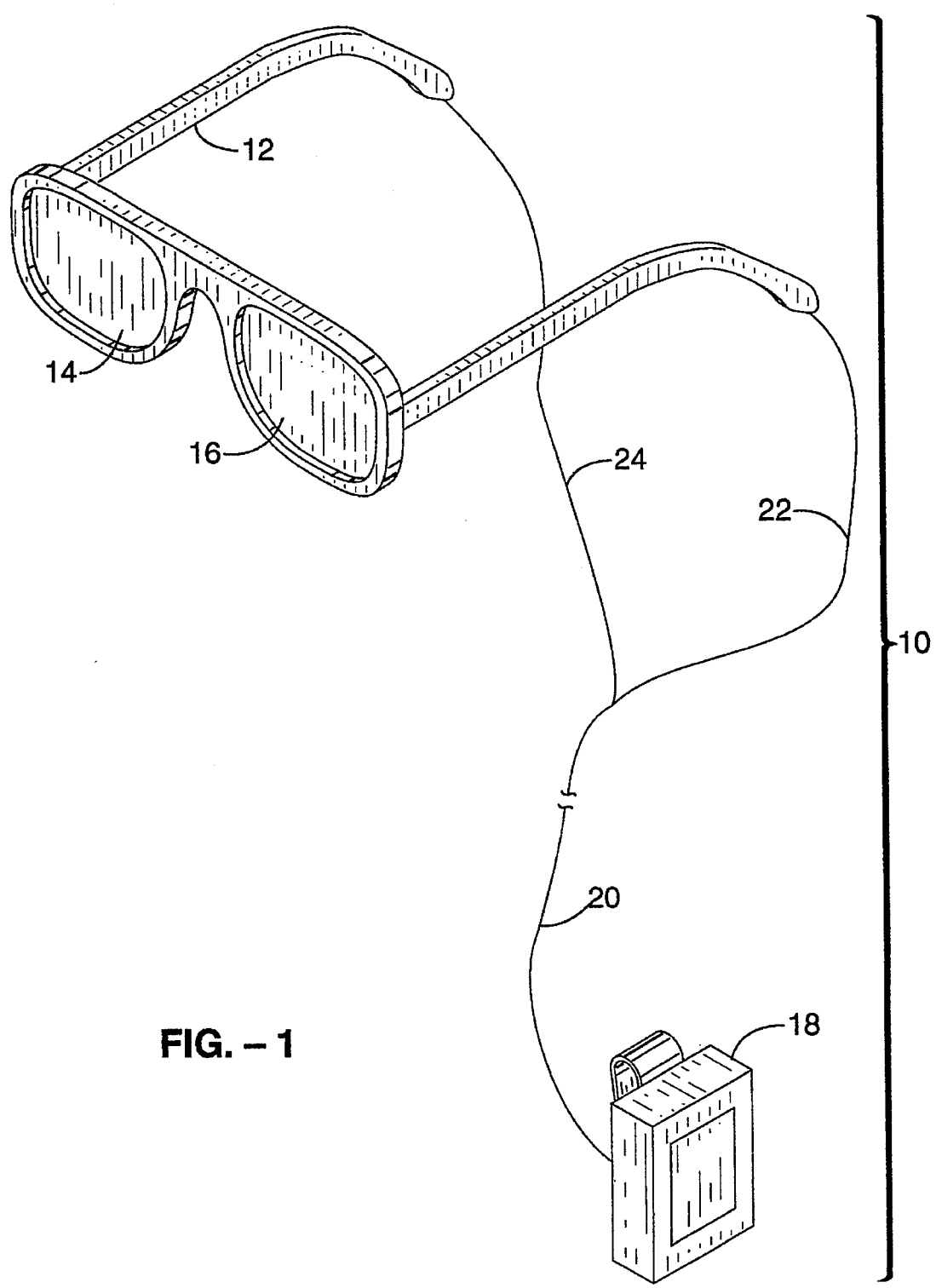
FIG. 1 is a diagrammatic view of the apparatus of the present invention, showing the lenses of the present invention mounted in a frame and coupled to a control unit.

Referring more specifically to the drawings, for illustrative purposes the present invention is embodied in the apparatus which is generally shown in FIG. 1, FIG. 2, and FIG. 3A through FIG. 3D, where like parts are designated with like reference numerals. It will be appreciated that the apparatus may vary as to configuration and as to details of the parts, and that the method may vary as to the specific steps and their sequence, without departing from the basic concepts as disclosed herein.

Referring to FIG. 1, a dynamic visual acuity training apparatus 10 in accordance with the present invention is shown. The apparatus includes a frame 12 which resembles a conventional eyeglass frame and which is worn by a person in the same manner as eyeglasses. Supported by frame 12 are a pair of voltage controlled liquid crystal lenses comprising a right eye lens 14 and a left eye lens 16. In the preferred embodiment, these lenses are fabricated from a polymer dispersed liquid crystal material wherein bubbles of liquid crystal cells are embedded in polymer. The fronts and backs of these lenses are coated with a transparent conductive material. When voltage is applied, the lenses become transparent and visual images can be transmitted through the lenses. When voltage is removed, the lenses become opaque, thereby preventing transmission of visual images through the lenses. Further, in this opaque state, the molecules line up in a generally perpendicular orientation in relation to the front and back surfaces of the lenses and, as a result, the lenses scatter background light rather than block background light. This is a significant advantage of the invention in that when the lenses are in their normally "off" state of opacity, the wearer does not see a dark surface when looking "through" the lenses. Instead, a generally constant level of contrast and brightness results so as to prevent pupil dilation changes when switching between the opaque state to the transparent state. Additionally, the lenses are driven to transparency at low voltages and can be switched from one state to the other at high speeds.

The lenses used herein are switched from their normally opaque state to a transparent state by means of an electronic control unit 18. Control unit 18 is operatively coupled to lenses 14, 16 by means of a four-wire interconnecting cable 20 having a two-wire left eye branch circuit 22 and a two-wire right eye branch circuit 24. Alternatively, control unit 18 could be miniaturized and fully integrated into frame 12.

Figure 2:
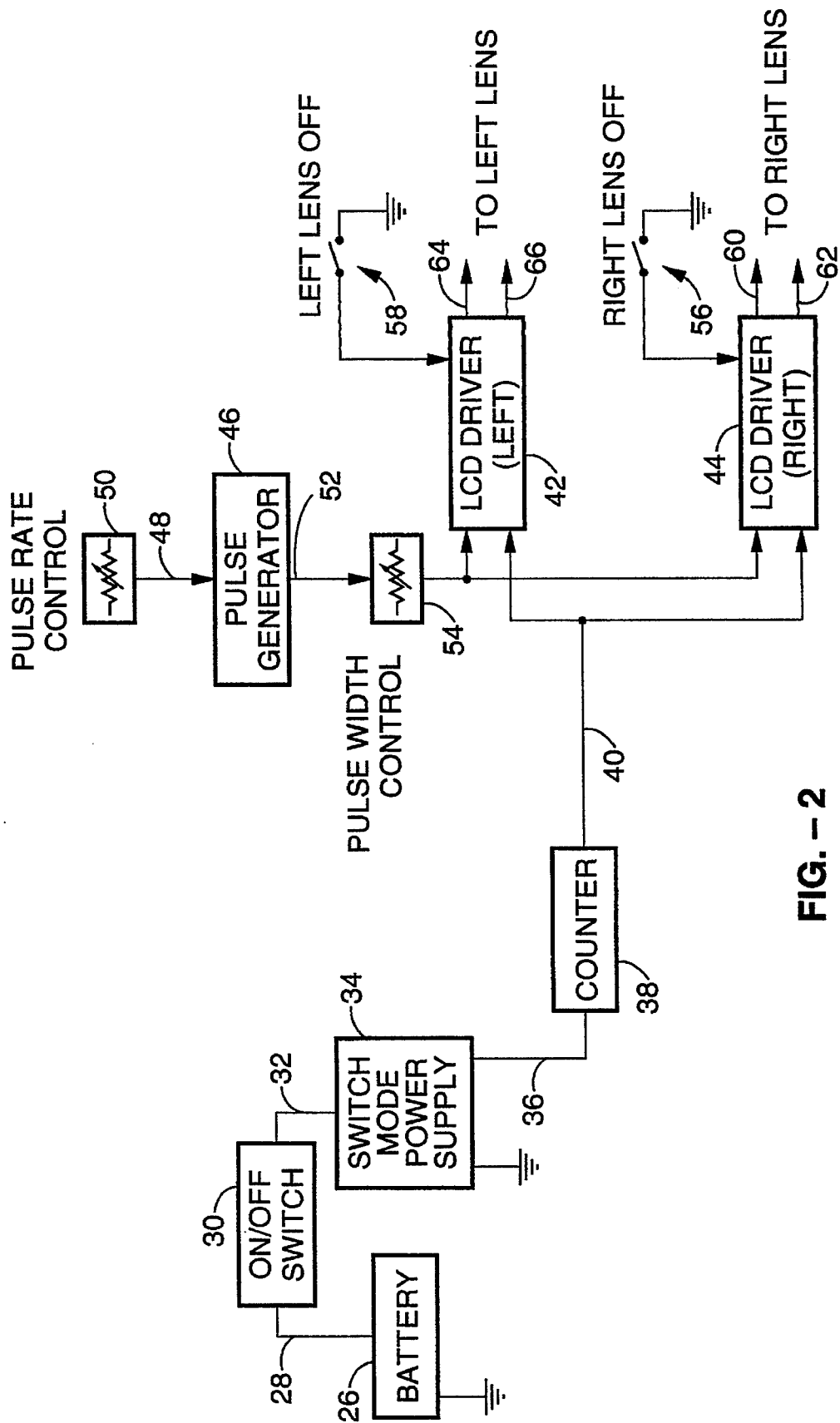
FIG. 2 is a functional block diagram of the control unit portion of the invention shown in FIG. 1.
Figure 3A:
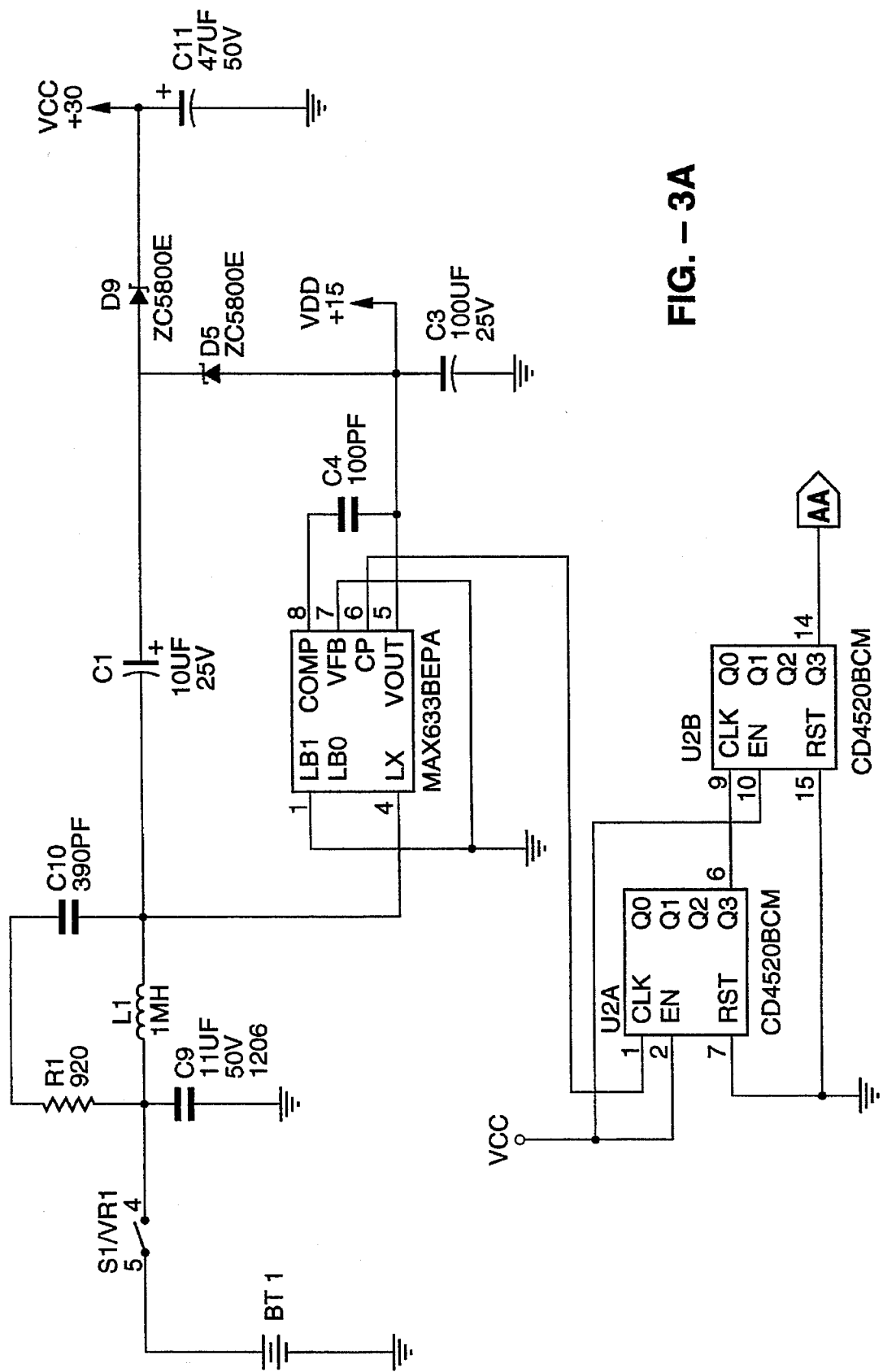
Figure 3B:
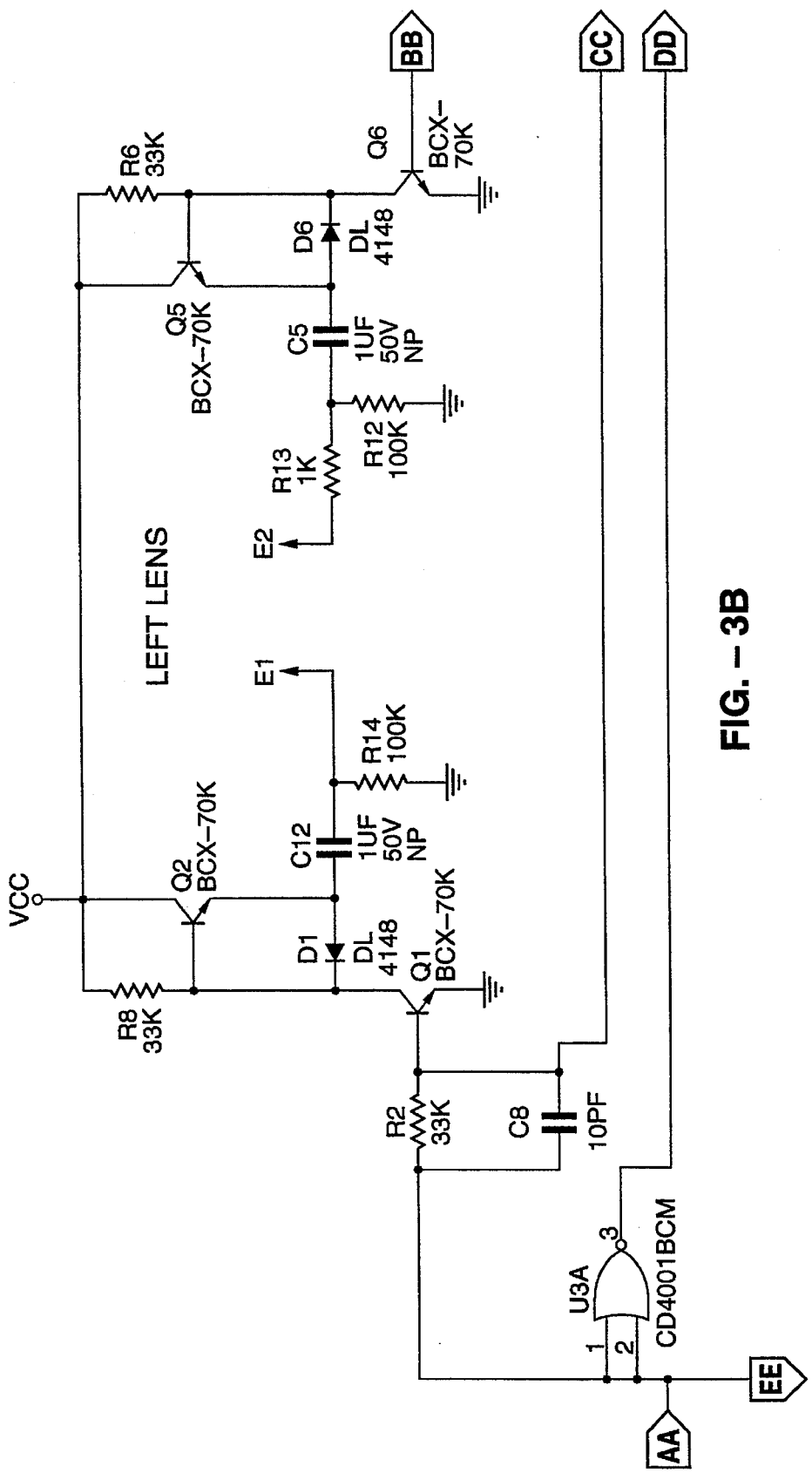
Figure 3C:
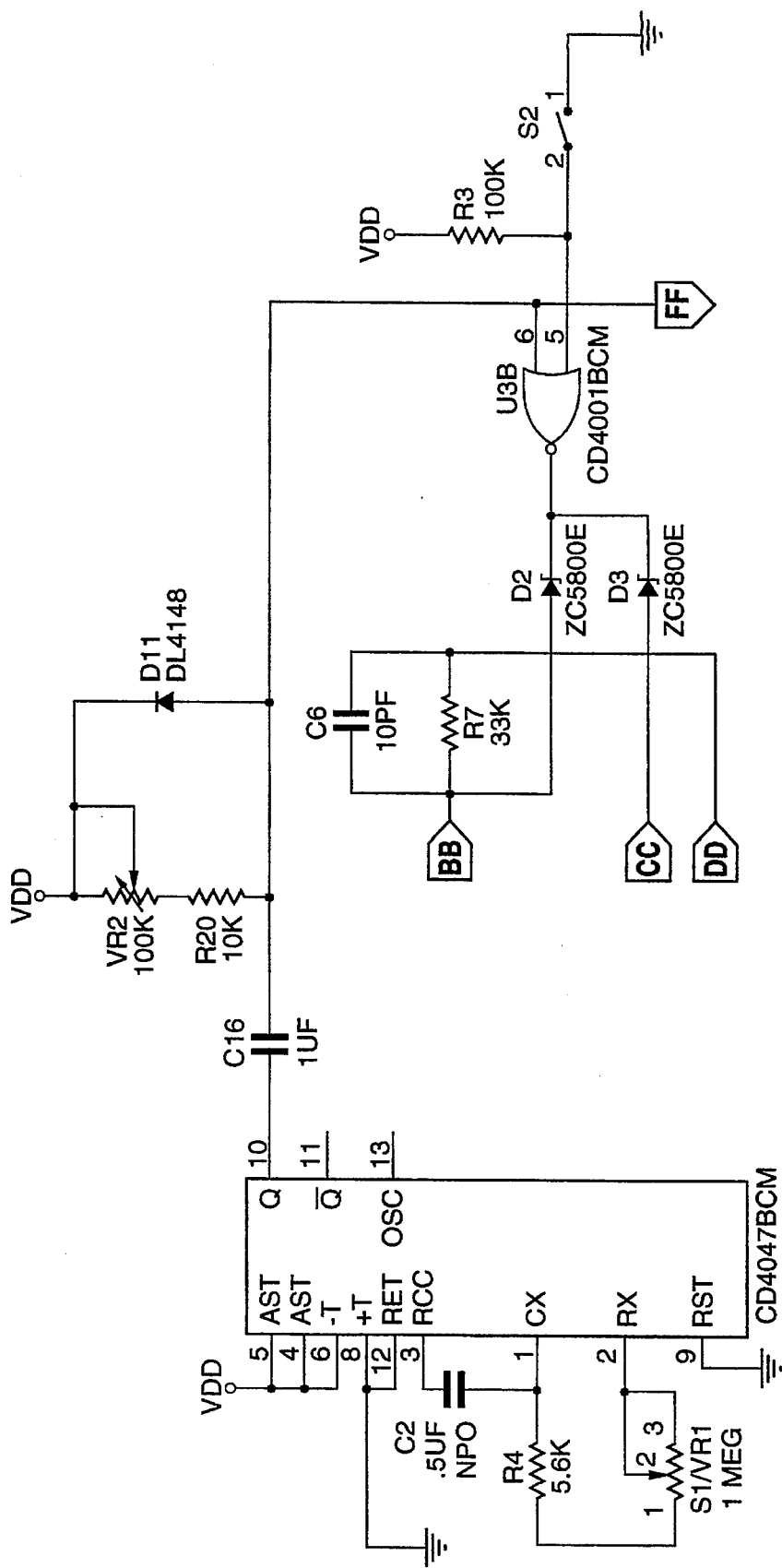

Referring also to FIG. 2, a functional block diagram of control unit 18 is shown. Control unit 18, as well as lenses 14, 16, are powered by a conventional battery 26 coupled to an on/off switch 30 through interconnection 28. On/off switch 30 is in turn coupled to a switching mode power supply 34 through interconnection 32. Switching mode power supply 34 is a conventional fixed/adjustable output step up switching regulator, such as a Maxim MAX633 or equivalent, and is used to provide the required voltages to operate the circuitry associated with control unit 18. In addition, switching mode power supply 34 provides a clocked output running at nominal frequency of 50 kHz. This clocked output is coupled to a "divide by" counter 38 through interconnection 36. Counter 38, which is a conventional counter such as an RCA CD4520 or equivalent, divides the clock frequency of 50 kHz nominal to a final frequency of approximately 200 Hz. The resultant voltage waveform is applied to left LCD driver 42 and right LCD driver 44 through interconnection 40 and is used to drive lenses 14, 16 in their "on" or transparent state.

Lenses 14, 16 are switched or "pulsed" between their transparent and opaque states at a uniform pulse rate by means of a pulse generator 46. Pulse generator 46 comprises a conventional multivibrator, such as an RCA CD4047 or equivalent, and is coupled to a pulse rate control 50 through interconnection 48. Pulse rate control 50, which includes a conventional log-taper potentiometer or equivalent, provides a range of control from approximately one-half pulses per second to approximately eighty pulses per second. In addition, a pulse width control 54, which includes a conventional linear-taper potentiometer or equivalent, is coupled to pulse generator 46 through interconnection 52. Pulse width control 54 provides an on time of the pulses ranging from approximately 10 milliseconds to approximately 100 milliseconds. In this manner, pulse width control 54 provides means for varying the time ratio between the transparent state and the opaque state of the lenses.

Each lens 14, 16 can set to operate independently or in synchronization with each other by means of right lens off switch 56 or left lens off switch 58, respectively. Independent control permits the user to maintain one lens in the opaque state while pulsing the other lens, rather than pulsing both lenses at the same time.

Interconnecting cable 20 is coupled to control unit 18 by means of LCD driver outputs 60, 62, 64 and 66. In operation, the user activates on/off switch 30 which powers up the apparatus. The pulse rate of the apparatus is then adjusted using pulse rate control 50, and a resultant output signal is directed to lenses 14, 16 through interconnecting cable 20. The user then views an object through lenses 14, 16 and employs the method of use described herein.

Referring to FIG. 3A through FIG. 3D, an exemplary schematic diagram corresponding to the functional block diagram of FIG. 2 is shown. Those skilled in the art will appreciate that other circuit configurations can be employed, and that substitutions between analog and digital circuit can be made, without departing from the concepts of the invention as disclosed. As heretofore described, the circuitry shown can be housed in a remotely coupled control unit 18 or integrated directly into frame 12.

Referring again to FIG. 1 and FIG. 2, interconnecting cable 20 is coupled to control unit 18 by means LCD driver outputs 60, 62, 64 and 66. In operation, the user activates on/off switch 30 which powers up the apparatus. The pulse rate of the apparatus is then adjusted using pulse rate control 50, and a resultant output signal is directed to lenses 14, 16 through interconnecting cable 20. The user then views an object through lenses 14, 16 and reacts to that object.

By way of example, and not of limitation, the method of the present invention can be seen in the following exemplary steps described in connection with specific sports and activities.

EXAMPLE 1

Baseball

A. Hitting

For this type of training, the pulse rate of the apparatus is first set to the highest rate. The user then puts on the apparatus and watches several pitches through the lenses without swinging the bat. Preferably the pitching source will be at a constant speed. A pitching machine, where the velocity can be controlled, is the ideal source. Next, the user swings at each pitch as it is thrown. As the frequency of hits increases, the pulse rate is reduced. In this regard, it should be noted that only the present invention should be adjusted to control the apparent velocity of the ball. It becomes much more difficult to train when both the speed of the pitch is varied and pulse rate of the present invention is lowered. As the user adapts to the reduction in time that the visual information is displayed (which is the same thing that happens when the speed of the ball is faster), the user reduces the pulse rate. Doing so will result in increasing the frequency that the user is able to hit a live pitched ball at faster speeds. After successfully using the present invention with a pitching source such as a pitching machine, it is preferred that the user switches to live batting practice pitches. This will help the user prepare for the actual game, and also permit the player to "see" faster pitches that he or she otherwise would in a controlled batting practice situation. Also, the player will be better adjusted and more ready for the actual game.

B. Catching

Here, the pulse rate of the apparatus is again initially set to the highest rate. The user then slowly tosses a ball back and forth with another player. Next, the user increases the speed of the toss to a comfortable level. As catching proficiency increases, the pulse rate of the apparatus is reduced. The user then continues to play catch until he or she is consistently catching the ball. Next, the user reduces the pulse rate further and continues to play catch. Preferably, once the user achieves a reasonable proficiency, variation is added to the training by using the apparatus while the speed of the speed of the thrown ball is varied, and by catching pop-ups, throws to the user's backhand, and fly balls. By using the apparatus in pregame warmups, the user's speed and proficiency can be increased prior to an actual game. The user will decrease his or her reaction time by using the apparatus, and will increase the chances for a sensational catch while making more catches look routine than ever before.

C. Fielding and Throwing

Again, the pulse rate of the apparatus is initially set to the highest speed. The user then has another player or machine slowly roll a ball directly to the user. As proficiency in fielding ground balls increases, the speed of the ground balls is gradually increased to a comfortable level (e.g., normal playing speed). Next, the user decreases the pulse rate of the apparatus and continues to field ground balls until he or she is consistently catching the ball at the normal playing speed. The pulse rate is again reduced, and the user continues to field ground balls to increase proficiency.

Again, it is preferable that, once the user achieves a reasonable proficiency, variation is added to the training by using the apparatus while catching ground balls to the left and right. This will increase the user's proficiency in smoothly fielding ground balls.

EXAMPLE 2

Tennis

For this type of training it is preferred that the user start with an automatic ball machine so that he or she can react to approaching tennis balls at a constant speed and trajectory.

A. Ground Strokes

First, the user sets the pulse rate at the fastest setting and puts on the apparatus.

Next, using a tennis racquet, the user attempts to hit each ball with a normal ground stroke. As the user's ability to hit each ball increases, the pulse rate is slowly decreased and the user continues to attempt to hit each ball. The user then reduces the pulse rate and continues the process until the desired level of proficiency is achieved. In this regard, it should be noted that, when playing tennis, a player must rely on quickness, anticipation, footwork, speed and concentration. Intertwined in most all of the "game skills" are visual processing abilities, including visual reaction times, depth perception, tracking, binocular fusion, and visual concentration. Use of the apparatus in the manner described will increase those visual skills.

As a pre-game warm up method, the user would set the pulse rate at a level slightly less than the fastest rate attempt to hit the balls. As the user's proficiency increases, the user would reduce the pulse rate. As a result, the user will be forced to read the ball sooner-and thus react more quickly. Preferably, the user would continue to reduce the pulse rate even more throughout the warm up.

B. Net Play

First, the user sets the pulse rate at the fastest setting and puts on the apparatus. Next, using a tennis racket, the user positions himself at the net to hit each ball with a normal return stroke. Then as the user's ability to hit each ball increases, the user slowly reduces the pulse rate and continues to play at the net. The user continues to decrease the pulse rate and play at the net until the desired level of proficiency is achieved.

C. Serving

First, the user sets the pulse rate at the fastest setting and puts on the apparatus. The user then acclimates by practicing tossing the ball in the air (e.g., service toss) while looking through the lenses. When the user is comfortable with viewing the ball in this manner, he or she picks up a racquet and serves with a normal toss and serve. As the user's ability to successfully complete the serve increases, the user reduces the pulse rate and continues practicing the toss and serve. The user continues to decrease the pulse rate and practice serving until the desired level of proficiency is achieved. As a result of this method, the user develops better concentration and, at the same time, learns to rely more upon depth perception. This is because when a ball is tossed in the air, the user generally has only the sky as a reference point for depth perception. By employing the foregoing method, the user learns to depend more on his or her depth perception due to the resultant visual disruption.

D. Return of Service

First, the user sets the pulse rate at the fastest setting and puts on the apparatus. Next, the user assumes a position to return a serve. The user then acclimates to the apparatus by viewing several serves. When the user is so acclimated, the user picks up his or her racquet and attempts to return a serve. As the user's ability to successfully return serves increases, the user reduces the pulse rate and continues to return serves. The user continues to decrease the pulse rate and practice returning serves until the desired level of proficiency is achieved. The process is duplicated for forehand and backhand returns.

EXAMPLE 3

Basketball

A. Rebounding

Rebounding is essentially reacting to the ball by moving one's arms and hands into the ball's visually projected path and jumping to get there as fast as the player can. To improve rebounding skills, the player first sets the pulse rate at the fastest setting and puts on the apparatus. The player then slowly tosses a basketball ball back and forth to another player and increases the speed of the toss to a comfortable level. Next, the player slowly reduces the pulse rate and continues playing catch until he or she is consistently catching the ball. The player then reduces the pulse rate further and continues playing until he or she achieves the desired level of proficiency. Next, the user has another player shoot the ball while the user tries for the rebound on the missed shots. After the user successfully rebounds several missed shots, the user slowly reduces the pulse rate and continues the try for the rebound on missed shots. Then, the user reduces the pulse rate further and continues to practice retrieving missed shots on the rebound. As a result, the user will improve his or her hand-eye coordination.

As an additional step in the training, the user would then turn away from the other player and have the other player pass the ball to the user as the other player calls out the user's name. The user would then turn and pick up the ball in flight to complete the catch.

B. Defense

First, the user sets the pulse rate at the fastest setting and puts on the apparatus. The user then has another player dribble a basketball in front of the user. The user then tries to steal the ball away from the other player. As the user increases the frequency with which he or she is able to steal the ball, the user slowly reduces the pulse rate. The user then continues to try to steal the ball away from the other player, and continues to reduce the pulse rate as his or her proficiency increases to the desired level. As additional steps in the training, the user follows the same steps but practices stealing passes and blocking shots.

C. Offense

First, the user sets the pulse rate at the fastest setting and puts on the apparatus. The user then practices shooting free throws. Next, the user reduces the pulse rate and continues shooting. This will enhance the user's focusing ability and concentration. After the desired level of proficiency in achieved, the user progresses to lay-up shots and reduces the pulse rate as proficiency increases. After the desired level of proficiency is achieved, the user moves to baseline, wing, and 3 point range shots. The user reduces the pulse rate as he or she practices until the desired level of proficiency is achieved. As an additional step, the user can repeat the process while having another player guard as the user attempts to make his or her shots. This step will force the user to get shots off quicker, to focus harder, and pick up the basket faster.

EXAMPLE 4

Golf

A. Woods and Irons

First, the user sets the pulse rate at the fastest setting and puts on the apparatus. Next, the user takes practice swings with a club. Then, when the user tees up a ball and takes a normal swing. The user then reduces the pulse rate and continues with normal swings.

B. Putting

First, the user sets the pulse rate at the fastest setting and puts on the apparatus. Next, the user takes practice swings with his or her putter. Then, the user drops a ball and takes a practice putt. Next, the user slowly reduces the pulse rate and continues putting. The user then continues to reduce the pulse rate to the slowest rate possible where the user can make a constant and smooth swing with the desired impact on the ball.

As can be seen, the foregoing golfing skills are based on concentration and the ability of the user to keep his or her eye on the ball. Concentration can be further improved by keeping one lens in the opaque state while the other lens is pulsed on and off. In this mode, any movement of the user's head will exaggerate or compound loss of visual contact with the stationary object.

EXAMPLE 5

Trap, Skeet and Target Shooting

First, the shooter sets the pulse rate at the fastest setting and puts on the apparatus. Next, the shooter watches another person shoot. When the shooter is comfortable with viewing a moving target, the shooter commences shooting at this or her own target. Next, the shooter slowly reduces the pulse rate while concentrating on viewing the target and continuing to shoot. The shooter continues to reduce the pulse rate until the desired level of proficiency is achieved.

EXAMPLE 6

Football

For improving passing skills, the user first sets the pulse rate at the fastest setting and puts on the apparatus. Next, the user throws short passes to a stationary receiver. The user then reduces the pulse rate and continues throwing. Once the user is proficient with throwing to a stationary receiver, he or she increases the pulse rate and throws to a moving receiver. The user then continues to have the receiver run the same pattern and reduces the pulse rate until the desired level of proficiency is achieved. Other skills, such as catching and offensive and defensive reads, can be improved in a similar manner.

It will be appreciated, therefore, that the present invention can be used for improving dynamic visual acuity in connection with a number of sports or activities involving viewing and reacting to stationary or moving objects. In particular, the invention provides for improving hand-eye coordination, foot-eye coordination, concentration, and the ability to focus on a stationary or moving object. In general terms, it is preferable to initially set the pulse rate of the lenses at the highest speed. The lenses, being positioned in the line of sight between the user and a moving object, will create the appearance that the object is moving at a speed slower than the actual speed of movement of the object since fewer frames of information are received by the eyes and transmitted to the brain. As a result, the user will have to react as if the object was moving faster than its actual speed. Similarly, since discontinuous visual information is presented to the brain, viewing of both moving and fixed objects will require increased concentration. As proficiency in reacting to the object increases at a particular pulse rate, the user or trainer reduces the pulse rate and continues to react to the object at the lowered rate. Training thus continues until the desired level of proficiency is achieved.

Accordingly, it will be seen that this invention provides for efficient and effective improvement of dynamic visual acuity and reaction time in sports and activities involving the viewing of stationary or moving objects. Although the description above contains many specificities, these should not be construed as limiting the scope of the invention but as merely providing illustrations of some of the presently preferred embodiments of this invention. Thus the scope of this invention should be determined by the appended claims and their legal equivalents.

We claim:

1. An apparatus for improving dynamic visual acuity, comprising:
   (a) at least one lens, said lens including means for switching between a state of transparency for transmission of visual images through said lens and a state of opacity for preventing transmission of visual images through said lens;
   (b) control means, operatively coupled to said lens, for alternating between said state of transparency and said state of opacity at a uniform rate, for simulating, visually, movement of an object viewed by a person at a slower than actual speed and for causing the person to react as if the object was moving at a greater than actual speed; and
   (c) support frame means for supporting said lens on the head of said person.

2. An apparatus as recited in claim 1, further comprising means for scattering light during said state of opacity and preventing changes in dilation of the person's pupils when switching between said state of transparency and said state of opacity.

3. An apparatus as recited in claim 1, further comprising means for varying the rate at which said lens alternates between said state of transparency and said state of opacity.

4. An apparatus as recited in claim 1, further comprising means for varying the time ratio between said state of transparency and said state of opacity.

5. An apparatus for improving athletic ability by varying visual images of viewed objects, comprising:
   (a) a first lens, said first lens including means for switching between a state of transparency for transmission of visual images through said first lens and a state of opacity for preventing transmission of visual images through said first lens;
   (b) a second lens, said second lens including means for switching between a state of transparency for transmission of visual images through said second lens and a state of opacity for preventing transmission of visual images through said second lens;
   (c) control means, operatively coupled to said first lens and said second lens, for alternating between said state of transparency and said state of opacity at a uniform rate, for simulating, visually, movement of an object viewed by a person at a slower than actual speed and for causing the person to react as if the object was moving at a greater than actual speed; and
   (d) support frame means for supporting said first lens and said second lens on the head of said person.

6. An apparatus as recited in claim 5, further comprising means for scattering light during said state of opacity and preventing changes in dilation of the person's pupils when switching between said state of transparency and said state of opacity.

7. An apparatus as recited in claim 5, further comprising means for varying the time ratio between said state of transparency and said state of opacity of said first and seconds lenses.

8. An apparatus as recited in claim 5, further comprises means for varying the rate at which said first lens and said second lens alternate between said states of transparency and opacity.

9. An apparatus as recited in claim 5, further comprising means for disabling a selected one of said lenses from switching between said state of transparency and said state of opacity and wherein said lens remains in said state of opacity.

10. An apparatus for pulsing visual images viewed by a human wearer to improve dynamic visual acuity, comprising:
 (a) a first bi-state liquid crystal lens;
 (b) a second bi-state liquid crystal lens, said first lens and said second lens including voltage control means for controlling said lens between a transparent state and an opaque state;
 (c) control means, operatively coupled to said first lens and said second lens, for applying uniform voltage pulses to said first lens and said second lens: for alternating said lenses between said transparent state and said opaque state, for simulating, visually, movement of an object viewed by a person at a slower than actual speed and for causing the person to react as if the object was moving at a greater than actual speed; and
 (d) support frame means for supporting said first lens and said second lens on the head of said person.

11. An apparatus as recited in claim 10, further comprises means for varying the rate of said voltage pulses.

12. An apparatus as recited in claim 11, further comprising means for scattering light during said state of opacity and preventing changes in dilation of the person's pupils when switching between said state of transparency and said state of opacity.

13. An apparatus as recited in claim 12, further comprising means for disabling a selected one of said lenses from switching between said transparent state and said opaque state and wherein said lens remains in said opaque state.

14. An apparatus as recited in claim 13, further comprising means for varying the time ratio between said transparent state and said opaque state.

15. A method of improving dynamic visual acuity, comprising the steps of:
 (a) positioning at least one lens in the line of sight between a person and an object, said lens including means for switching between a state of transparency for transmission of visual images of the object through said lens and a state of opacity for preventing transmission of visual images of the object through said lens;
 (b) switching said lens between said state of transparency and said state of opacity at a first uniform rate;
 (c) simulating, visually, movement of the object viewed by the person at a slower than actual speed and causing the person to react as if the object was moving at a greater than actual speed;
 (d) monitoring changes in the person's dynamic visual acuity in response to the object; and
 (e) repeating steps (b) through (d) until said dynamic visual acuity improves to a desired level.

16. A method as recited in claim 15, wherein said lens scatters light during said state of opacity.

17. A method as recited in claim 15, further comprising the step of reducing the rate at which said lens alternates between said state of transparency and said state of opacity in response to improvement in said dynamic visual acuity.

18. A method for improving the ability to react to objects by varying visual images of said objects, comprising the steps of:
 (a) positioning a first lens in the line of sight between a person and an object, said first lens including means for switching between a state of transparency for transmission of visual images of the object through said first lens and a state of opacity for preventing transmission of visual images of said object through said first lens;
 (b) positioning a second lens in the line of sight between the person and the object, said second lens including means for switching between a state of transparency for transmission of visual images of the object through said second lens and a state of opacity for preventing transmission of visual images of the object through said second lens;
 (c) switching at least one of said lenses between said state of transparency and said state of opacity at a first uniform rate;
 (d) simulating, visually, movement of the object viewed by the person at a slower than actual speed and causing the person to react as if the object was moving at a greater than actual speed;
 (e) monitoring changes in the person's dynamic visual acuity in response to the object; and
 (f) repeating steps (c) through (e) until said dynamic visual acuity improves to a desired level.

19. A method as recited in claim 18, wherein said lenses scatter light during said state of opacity.

20. A method as recited in claim 18, further comprising the step of reducing the rate at which said lens switches between said state of transparency and said state of opacity in response to improvement in said dynamic visual acuity.

21. A method as recited in claim 18, further comprising the step of switching said first lens and said second lens in synchronization.

22. A method as recited in claim 18, further comprising the step of disabling a said one of said lenses wherein said lens remains in said state of opacity and switching said other of said lenses between said state of transparency and said state of opacity at a uniform rate.

23. A method for pulsing visual images viewed by a human wearer to improve physical coordination and concentration, comprising the steps of:
 (a) positioning a first bi-state liquid crystal lens in the line of sight between a person and an object;
 (b) positioning a second bi-state liquid crystal lens in the line of sight between the person and the object, said first lens and said second lens including voltage control means for controlling said lens between a transparent state and an opaque state;
 (c) applying uniform voltage pulses to at least one of said lenses wherein said lens alternates between said transparent state and said opaque state;
 (d) simulating, visually, movement of the object viewed by the person at a slower than actual speed and causing the person to react as if the object was moving at a greater than actual speed;
 (e) monitoring changes in said human subject's dynamic visual acuity in response to the object; and
 (f) repeating steps (c) through (e) until said dynamic visual acuity improves to a desired level.

24. A method as recited in claim 23, wherein said lenses scatter light during said opaque state.

25. A method as recited in claim 23, further comprising the step of reducing the rate at which said lens switches between said transparency state said opaque state in response to improvement in said dynamic visual acuity.

26. A method as recited in claim 23, further comprising the step of apply uniform voltage pulses to said first lens and said second lens in synchronization.

27. A method as recited in claim 23, further comprising the step of disabling a said one of said lenses wherein said lens remains in said opaque state and applying uniform voltage pulses to said other of said lenses.

* * * * *